United States Patent Office 3,323,536
Patented June 6, 1967

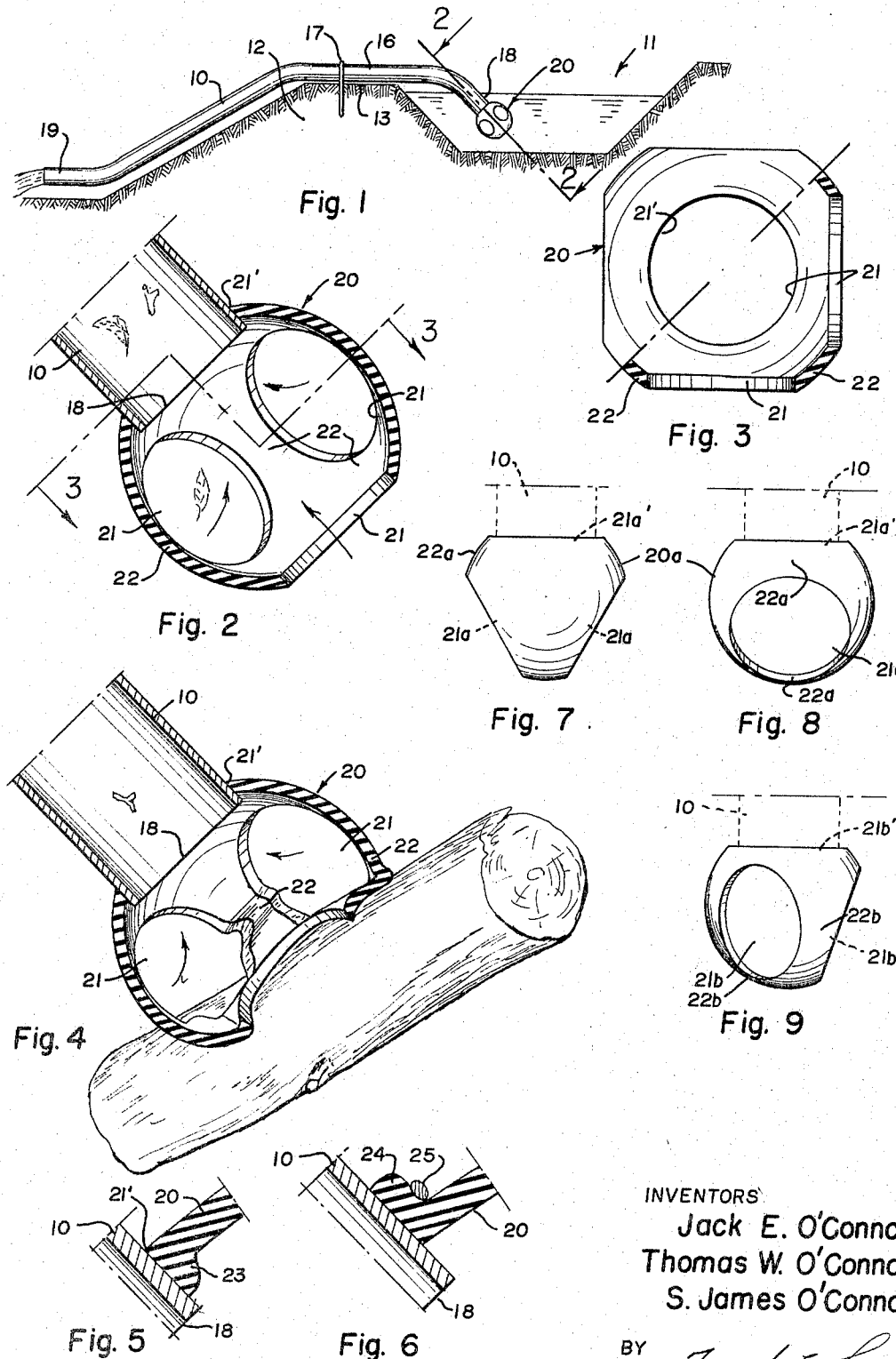

3,323,536
SIPHON TUBE TRASH GUARD
Jack E. O'Connor and Thomas W. O'Connor, Grand Junction, and S. James O'Connor, Fruita, Colo., assignors to said Jack E. O'Connor, said Thomas W. O'Connor, and said S. James O'Connor, jointly
Filed June 11, 1964, Ser. No. 374,516
8 Claims. (Cl. 137—140)

This invention relates to trash guards for submerged conduit intakes and more particularly to guarding arrangements for protecting the submerged intakes of irrigation siphon tubes.

One mode of distributing irrigation water onto a field alongside and below an irrigation ditch consists in drawing the water from a full irrigation ditch, or lateral thereof, at a number of points along the ditch by means of siphon tubes. Such siphon tubes are ordinarily one to four inches in diameter, three to ten feet long, and are curved and formed to lie upon the side bank of the ditch, with the intake extending into and being submerged in the ditch, and with the discharge end extending down the embankment and to the edge of a field below the ditch. Once primed, the siphon will discharge a comparatively uniform flow from the irrigation ditch as long as the ditch is full of water. This eliminates the necessity of cutting into the ditch bank or providing for an auxiliary lateral in the field with many individual openings. A number of such siphons may be regularly spaced along the ditch bank so that each siphon will irrigate a selected number of trenches in the field, and all in all, such provides an efficient and effective irrigation operation.

Several problems arise in the use of siphons of this type for they are prone to be clogged by weeds and the like which cause them to malfunction, resulting in an appreciable loss of irrigation water and erratic distribution of water in the field. In the first place, the water in an open irrigation ditch, usually diverted from a river or stream, will contain a large amount of detritus such as leaves, twigs, sticks, grass clumps, and the like. Much of this material can plug a siphon intake to cut off its flow. Actually, the amount of such detrital material in an irrigation ditch is usually so great that it will quickly clog the mesh of conventional screen-type guard of the type commonly used in the conduit intakes of wells and large reservoirs where the water supply is either protected or consists of a body sufficiently large to permit settlement of such detritus.

This problem would be far more serious except for the fact that the siphons are comparatively short, and that smaller particles may pass through them without harm. Accordingly, it has been a practice to use the siphon tubes without any protectors whatsoever at their intake and constantly check on the tube to make sure that larger particles do not clog a siphon. Naturally, whenever a larger clump of weeds, or sticks, or a small log plugs a siphon intake, it will have to be removed from the ditch and cleaned out.

The present invention was conceived and developed with the above factors in view and particularly, to meet the need of protecting a siphon tube intake from plugging by clumps of grass and other objects, and at the same time to permit small particles of detritus, such as twigs, blades of grass and leaves to pass through the siphon and not accumulate at the intake as they do with a conventional screen protector.

It follows that an object of the invention is to provide a novel and improved trash guard which is especially, but not exclusively, adapted to be used with field irrigation siphon tubes.

Another object of the invention is to provide a novel and improved trash guard for a siphon tube or the like, which may be quickly and easily attached to the intake end of the tube without any special fitting operations and which may be easily modified in its construction to fit various sizes of siphon tubes.

Another object of the invention is to provide a novel and improved trash guard for a siphon tube which is particularly adapted to permit small detrital objects to pass into and through the siphon without their impeding the flow of water therethrough, but at the same time which prevents larger objects from plugging the intake and preventing flow therethrough.

Another object of the invention is to provide a novel and improved trash guard for siphons which cannot be easily damaged by rough usage, either in handling or in use as when a comparatively heavy floating object strikes and tends to crush it.

Another object of the invention is to provide a novel and improved trash guard for a siphon having openings so formed and arranged as to permit the siphon to function effectively even though one or more of the openings become completely closed as by detritus.

Further objects of the invention are to provide a novel and improved construction of a trash guard for siphons and the like which is a simply-constructed, low-cost, neat-appearing, rugged and durable unit.

With the foregoing and other objects in view, all of which more fully hereinafter appear, our invention comprises certain constructions, combinations and arrangements of parts and elements as hereinafter described, defined in the appended claims and illustrated in preferred embodiment in the accompanying drawing, in which:

FIGURE 1 is a diagrammatic, transverse, sectional, elevational view of a ditch lateral having a siphon tube placed on the bank thereof, with the tube intake being submerged in the ditch and with the exhaust discharging at a level below the ditch water, and showing further the improved trash guard attached to the intake thereof.

FIGURE 2 is a sectional plan view of the trash guard and of a fragmentary portion of the intake end of the siphon tube, as taken from the indicated line 2—2 at FIG. 1, but on an enlarged scale.

FIGURE 3 is a partial-elevational, partial-sectional view of the trash guard per se, as taken substantially from the indicated line 3—3 at FIG. 2.

FIGURE 4 is a sectional plan view similar to FIG. 2, but illustrating the manner in which the trash guard may be partially crushed as by a floating log, and yet remain operative to permit water to flow into the siphon.

FIGURE 5 is a fragmentary portion of the showing at FIG. 2, as taken substantially from the indicated arrow 5 at FIG. 2, but on a greatly enlarged scale and illustrating further a slight modification of the construction of a portion of the guard.

FIGURE 6 is a fragmentary view similar to FIG. 5, but illustrating another modification of the portion of the guard.

FIGURES 7 and 8 are frontal and side elevational views of a first modified form of the trash guard, constructed according to the principles of the invention, but shown on a smaller scale than the embodiment illustrated at FIGS. 2 and 3, and with broken lines indicating the position of a siphon tube intake upon which the guard is to be mounted.

FIGURE 9 is a side elevational view similar to FIG. 8, but showing another modification of the trash guard.

Referring more particularly to the drawing, FIG. 1, thereof, illustrates one common arrangement of a siphon tube 10 in an irrigation ditch 11. Where such tubes are used, the irrigation ditch is usually located on a hillside or rise at the edge of the field being irrigated. Such a ditch is ordinarily confined by an embankment 12 at the downhill side thereof, which includes a walkway 13 and a sloping face 14 therebelow which terminates at the edge of the field indicated as 15. Actually, to irrigate a field of any size, it is a common practice to use a comparatively large number of siphon tubes 10, spaced apart at a suitable regular spacing so that the flow from each siphon tube is distributed to a selected number of trenches in the field or in any suitable similar maner.

Each siphon tube is formed and shaped as a rigid or substantially rigid length of pipe or tubing having a diameter from one to four inches, more or less. Each tube is formed as a flat U and may include a flat section 16 which lies upon the walkway top. The tube may be secured in position by a U-shaped stake 17. An intake 18 is turned downwardly from the flat section 16 to be submerged in the water of the ditch when the unit is in use. The discharge end 19 of the tube is adapted to lie against the sloping downstream face of the ditch to terminate at the bottom of the bank, as in the manner illustrated.

Such siphon tubes are generally comparatively short, some being three to ten feet long, more or less, depending upon the type of ditch location where they are used. In use, they are suitably primed in any conventional manner and ordinarily a full flow passes through each open tube. However, each tube may be equipped with a regulating valve if desired.

Our improved trash guard 20 is adapted to be placed at the intake 18 of such a siphon to be submerged whenever the siphon is being used. This trash guard is preferably formed as a spherical member which is a resilient, thick-walled shell having several large-diameter, regularly-arranged openings 21 therein. The diameter of each opening is substantially that of the conduit and at least one opening 21′ is adapted to fit upon the entrance end of the siphon as in the manner clearly illustrated at FIG. 2.

In the preferred embodiment illustrated at FIGS. 2, 3 and 4, this trash guard is formed with six circular openings 21, which are arranged in a block-like pattern about the spherical shell 20. Geometrically, the edge of each opening into the shell will lie in an imaginary plane intersecting the sphere as a circle, and the six imaginary planes are projected beyond the shell to form a symmetrical cube. It is to be noted that the diameter of this shell 20, as shown, is approximately 1.9 times the diameter of the siphon tube itself, and while it is contemplated that the respective diameters of the shell and tube may vary somewhat, the preferred proportions will be about as shown. In any event the shell will not be much more than two times the diameter of the openings in it.

This preferred shell 20 is made of a comparatively stiff, but resilient rubber or rubber-like synthetic resin so that it may be collapsed and crushed and yet return to its original form without being damaged. The narrow wall portions 22 between the adjacent openings 21 will be established by the comparative diameters of the shell 20 and openings 21 therein, and selection of the shell diameters to obtain a reasonably substantial portion 22 will be correlated with the type of rubber the shell is made of and its thickness, all to provide a unit which has moderate strength and will positively and quickly return to its spherical shape if flattened or otherwise crushed.

The placing of the shell upon the end of a siphon tube is a simple matter. The opening 21′, and preferably all of the openings, is of a diameter such as to provide a tight fit upon the end of the tube, with it being required to fit the shell upon the tube by stretching of the opening 21′. Accordingly, it is contemplated that the opening 21′ will be somewhat less in diameter than the outside diameter of the siphon tube 10. This fit upon the tube can be made reasonably permanent if nothing further is done, for there is a natural tendency for rubber to cement itself upon metal. Also common adhesives and cements suitable for the purpose at hand can be used.

Several variations of the structure are possible. Each opening 21 may be of a slightly different diameter to facilitate the easy fitting upon various sizes of siphon tubes. For example, a 2-siphon tube may have a 2-inch outside diameter, or a 2-inch inside diameter, with various wall thicknesses. It may also be a standard 2-inch pipe size. It follows that the size of the openings 21 may vary as, for example, from a minimum of size of 1¾ inches to 2¼ inches.

The form of each opening may also be modified from the simple construction illustrated at FIGS. 2 to 4. For example, an inturned reinforcing bead 23 may be formed at the edge of each opening 21 as illustrated at FIG. 5. This will tend to stiffen the opening and at the same time increase the effective bearing surface of the shell which bears about the tube intake 18. Another modification is illustrated at FIG. 6, where an out-turned foot 24 is formed about the opening 21a. Such a foot fits about the intake of the conduit, but in a manner opposite from that illustrated at FIG. 5, and this foot is further adapted to be strapped in position by a clamp wire 25. The wire may be secured tightly in position in any suitable manner.

In use with a siphon tube, it is contemplated that this guard will not stop the passage of small pieces of detritus through the siphon, for example, leaves, twigs, and blades of grass which are so small that they are not impeded by the openings of the trash guard. Such material will pass directly through the openings and through the siphon tube. This is of no consequence, for such particles passing through the tube will not create any undesirable deposit in the field below.

However, the openings 21 will prevent any clump or twig or branch large enough to plug the siphon from passing into it. Because of the use of a limited number of comparatively large openings, if a larger clump of grass, or the like, does lodge against one or more openings of the guard, it will not plug this trash guard because each of the openings is fully adequate to receive the entire flow through the siphon, and it is unlikely that the five spaced opposing openings of a trash guard such as that illustrated at FIGS. 2 and 3 will be plugged simultaneously.

The resilient construction of this trash guard permits the siphon tubes to be handled in a comparatively rough manner while they are being stored, transported, or installed. Moreover, if the trash guard is struck by a small log or similar object in the irrigation ditch, as in the manner illustrated at FIG. 4, it may smash the trash guard temporarily without incurring injury or without impeding the flow into the siphon. Even if the siphon is struck with such force as to dislodge the siphon from its position on the bank, the trask guard will not be injured.

The geometrical form of this siphon may be modified in several ways without changing the inventive concept thereof. While the preferred form of the shell is spherical, it may be spheroidal or even shaped with an angular or box-like figuration. Likewise, the number of orifices or openings 21 may be varied from a minimum of three to a somewhat larger number than that illustrated, although if the trash guard becomes much greater than twice the diameter of the siphon tube, it will become unwieldy to handle.

Using the preferred form, a spherical shell, it is likewise preferably to have the opening arranged in a regular array about this shell. The units illustrated at FIGS. 7 and 8 show a shell 20a having three openings 21a, and it is to be noted that such a guard can be formed of a minimum diameter compared with the size of the siphon tube intake 10, illustrated in broken lines in these figures. FIGURE 9 shows a spherical shell 21b, of similar form having four openings 21b, arranged in such a manner that extensions of the planes at the intakes of the openings will form a tetrahedron or pyramid-type figure.

While we have now described our invention in considerable detail, it is obvious that others skilled in the art can build and devise alternate and equivalent constructions which are nevertheless within the scope and spirit of our invention. Hence, we desire that our protection be limited,

We claim:

1. In combination with a siphon tube a trash guard comprising, a resilient sphere-like shell having a diameter substantially greater than the tube diameter, but less than approximately two times the tube diameter, and having a plurality of openings therein arranged about the shell in a regular pattern, with said openings being approximately the tube diameter, and with at least one of said openings fitting over and being affixed to the end of the siphon tube.

2. The trash guard defined in claim 1, wherein the shell is formed as a moderately-thick-walled, resilient material.

3. The trash guard defined in claim 1, wherein the shell is formed as a moderately-thick-walled resilient material and wherein said tube-fitting opening has a diameter slightly less than the diameter of the siphon tube whereby the shell is fitted upon and affixed to the end of the siphon tube by stretching the opening and releasing the same upon the tube.

4. The trash guard defined in claim 1, wherein the said tube-fitting opening is formed with a flange-like foot outstanding therefrom and being adapted to provide a broader contact surface upon the siphon tube.

5. The trash guard defined in claim 1, wherein said openings vary slightly in diameter from a minimum diameter to a maximum diameter to permit the guard to be fitted on tubes which vary slightly in diameter.

6. In the trash guard defined in claim 1, wherein the tube-fitting openings is reinforced with an outwardly projecting flange-like foot adapted to increase the bearing surface of the same, and a tightening wire, adapted to be secured about the foot.

7. In the trash guard defined in claim 1, wherein six openings are formed therein with the edges of the openings lying in planes when projected from a cube.

8. In the trash guard defined in claim 1, wherein the openings formed therein are not less than three and wherein the edges of the openings lie in planes which, when projected, form regular, simple geometrical figures.

References Cited

UNITED STATES PATENTS

| | | | |
|---|---|---|---|
| 664,833 | 1/1901 | Collins | 210—460 X |
| 1,361,691 | 12/1920 | Davis | 210—241 X |
| 2,916,147 | 12/1959 | Checke et al. | 210—460 X |
| 3,163,229 | 12/1964 | Salisbury | 210—460 X |

REUBEN FRIEDMAN, *Primary Examiner.*

SAMIH N. ZAHARNA, *Examiner.*

F. W. MEDLEY, *Assistant Examiner.*